June 3, 1924.

F. SOWINSKI

TRAP

Filed Nov. 19, 1923

1,496,181

INVENTOR.
Frank Sowinski
BY
ATTORNEY.

Patented June 3, 1924.

1,496,181

UNITED STATES PATENT OFFICE.

FRANK SOWINSKI, OF DETROIT, MICHIGAN.

TRAP.

Application filed November 19, 1923. Serial No. 675,578.

*To all whom it may concern:*

Be it known that I, FRANK SOWINSKI, a citizen of the United States, residing at Detroit, in the county of Wayne and State of Michigan, have invented a new and useful Improvement in a Trap, of which the following is a specification.

My invention relates to a new and useful improvement in a trap, adapted especially for the catching of smaller animals such as mice, rats and the like.

An object of the invention is the provision of a trap which will be easily operated, and quickly and safely and easily set.

Another object of the invention is the provision of a trap which will afford means of preventing the escape of the prey caught thereby and at the same time afford easy and quick means for removing the same from the trap.

Another object of the invention is the provision of a trap having cooperating leaves adapted for flattening out upon the release of the trip used for retaining the same in set position.

Other objects will appear hereinafter.

The invention consists in the combination and arrangement of parts hereinafter described and claimed.

The invention will be best understood from a reference to the accompanying drawings which form a part of this specification and in which.

Figure 1:
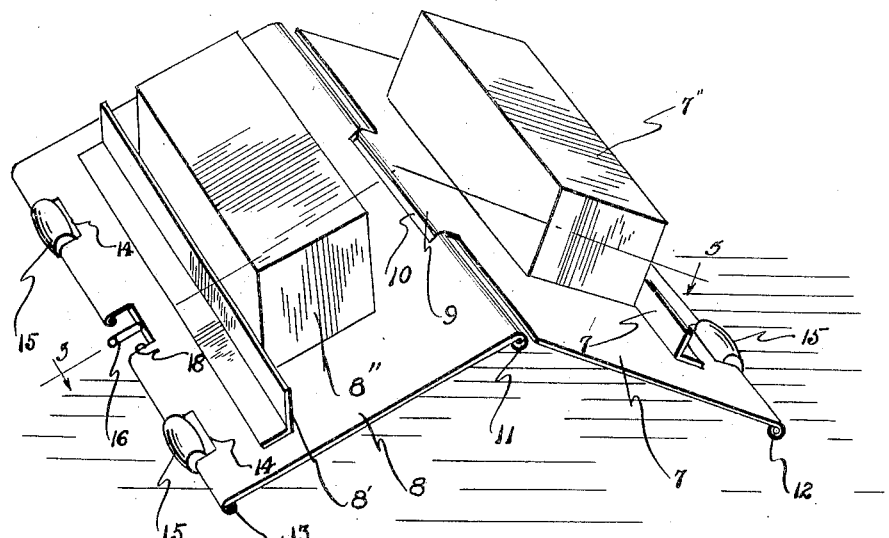
Fig. 1 is a perspective view of the invention in set condition.

The invention in its preferred form comprises a pair of leaves 7 and 8 which are provided on the outer surface with abutment members 7' and 8' respectively. The member 7 is provided with a tongue 9 which is curled along its edge to form a knuckle which engages in a recess or notch 10 formed in the leaf 8, these parts being made from suitable sheet metal. The edge of the leaf 8 is curled to form a knuckle 11 through which a pintle may be projected and passed through the knuckle formed on the tongue 9, thus serving to bind these parts in pivotal relation. The outer edges of the leaves 7 and 8 are curled to form knuckles 12 and 13 respectively through which pintles may be passed to rotatably mount rollers 15, said rollers being set in recesses 14 formed in the edges of the leaves.

A trip is used with the invention which comprises a rod 16 having a notch 17 formed therein adapted to engage the edge of the leaf 8 at the notch 18. An eyelet 16' is formed at one end of the rod and is attached to the edge of the leaf 7 by means of a cord 19 or other suitable flexible member.

Twined around the rod 16, intermediate its ends, and preferably adjacent the center thereof, is a wire formed into a frame 20 from which it projects in the form of a stem 21, the end of which is turned to engage around the rod 16, as at 22. A bait support 23 is mounted on the rod. When the bait is placed on the support 23 the stem is brought into engagement with the bait and then locked around the rod, the resiliency of the wire allowing of a certain amount of spring in the stem and frame 20.

Figure 2:
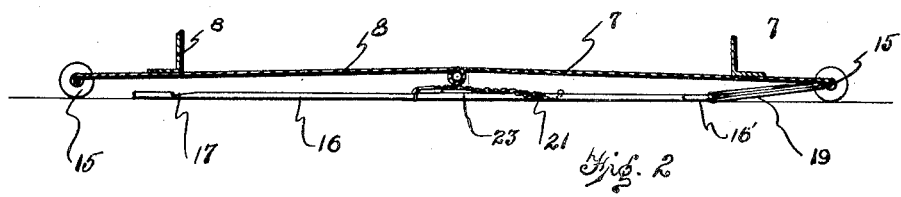
Fig. 2 is a side elevational view of the invention in sprung condition.
Figure 3:
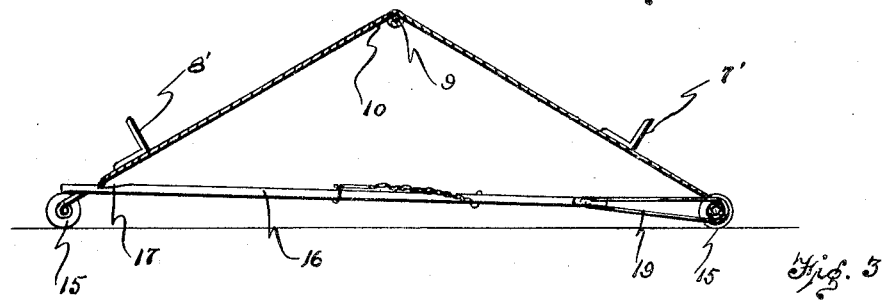
Fig. 3 is a sectional view taken on substantially line 3—3 of Fig. 1.
Figure 4:
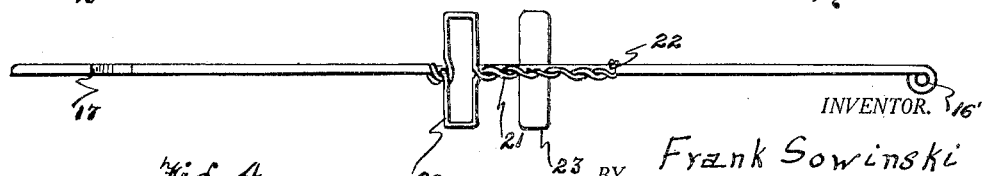
Fig. 4 is an elevational view of the trip used in the invention.

In operation the bait is placed on the support 23 and locked in position and the leaves are then moved to the position shown in Fig. 1. The rod is then positioned so that the notch 17 is engaged by the leaf 8, the notch 18 causing the rod to be lifted free from the supporting surface of the leaves. Suitable weights 7'' and 8'' are then placed on the leaves 7 and 8 respectively, the angle iron serving as an abutment to hold these weights in place. The animal in attempting to get the bait from its support will cause the rod to be disengaged from the leaf 8 either by turning the same or pressing it downwardly out of engagement with the leaf. When thus released the leaves will roll on the rollers 15 outwardly, until the device is collapsed to the position shown in Fig. 2. This movement will be a rapid one owing to the pressure of the weights 7'' and 8'', thus catching the animal and crushing it against the supporting surface of the device. It is apparent that no great effort is necessary to remove the animal from the trap after it is crushed and that no setting of springs is necessary to operate the trap.

While I have illustrated and described the preferred form of structure I do not wish to limit myself to the precise details of structure shown but desire to avail myself of such variations and modifications as come within the scope of the appended claims.

Having thus described my invention what I claim as new and desire to secure by Letters Patent is:

1. A trap comprising a pair of pivotally connected members; means for spreading said members into alignment with each other; means for preventing the spreading of said members apart; and a bait support mounted on said preventing means.

2. A trap comprising a pair of leaves pivotally connected along one edge thereof; rollers mounted on the opposite edge of said leaves; and a trip member adapted to prevent the withdrawal of said roller bearing edges from each other, said trip being provided with a notch adapted to engage the edge of one of said leaves.

3. A trap comprising a pair of leaves; a tongue formed on one edge of one of said leaves and adapted to engage in a recess formed in the edge of the other leaf; knuckles formed on said tongue and recessed edge to permit pivotal mounting of said leaves; rollers mounted on the free edges of said leaves; and a trip attached to one of said leaves and adapted to engage the edge of the other leaf for preventing the spreading of the same.

4. A trap comprising a pair of leaves hingedly connected together along one edge; rollers mounted on the opposite edge of each of said leaves; an abutment member mounted on each of said leaves; a flexible member secured to the free edge of one of said leaves; a rod attached at one end to said flexible member and provided adjacent its other end with a notch for engaging the free edge of the other leaf; and a bait trap mounted on said rod intermediate its ends.

5. A trap comprising a pair of leaves hingedly connected together along one edge; rollers mounted on the opposite edges of said leaves; an abutment member mounted on each of said leaves; a flexible member secured to the free edge of one of said leaves; a rod attached at one end to said flexible member and provided adjacent its other end with a notch for engaging the free edge of the other leaf; a bait support mounted on said rod intermediate the ends thereof; and resilient means for locking the bait on said support.

In testimony whereof I have signed the foregoing.

FRANK SOWINSKI.